United States Patent
Hufstedler

(10) Patent No.: US 9,820,470 B1
(45) Date of Patent: Nov. 21, 2017

(54) NO-BITE ANIMAL GUARD

(71) Applicant: Lucky Puppy Nail Specialists, LLC, Lakeland, FL (US)

(72) Inventor: Deborah Lorette Hufstedler, Lakeland, FL (US)

(73) Assignee: Lucky Puppy Nail Specialists, LLC, Lakeland, FL (US)

( * ) Notice: Subject to any disclaimer, the term of this patent is extended or adjusted under 35 U.S.C. 154(b) by 0 days.

(21) Appl. No.: 15/627,701

(22) Filed: Jun. 20, 2017

Related U.S. Application Data

(60) Provisional application No. 62/352,686, filed on Jun. 21, 2016.

(51) Int. Cl.
  *A01K 13/00* (2006.01)
  *A01K 25/00* (2006.01)
  *A61D 9/00* (2006.01)

(52) U.S. Cl.
  CPC ............ *A01K 25/00* (2013.01); *A01K 13/006* (2013.01); *A61D 9/00* (2013.01)

(58) Field of Classification Search
  CPC ...... A01K 13/006; A01K 1/0613; A61D 9/00; A61D 3/00
  USPC ....... 119/850, 821, 712, 814, 815, 416, 489, 119/832, 837, 856, 827; D30/151
  See application file for complete search history.

(56) References Cited

U.S. PATENT DOCUMENTS

| | | | | |
|---|---|---|---|---|
| 1,004,507 | A * | 9/1911 | Walz | A01K 55/00 2/4 |
| 2,191,589 | A * | 2/1940 | Sacks | A42B 1/046 2/174 |
| 2,685,091 | A * | 8/1954 | Thill | A42B 1/045 2/204 |
| 3,150,640 | A * | 9/1964 | Nevitt | A61D 3/00 119/416 |
| 6,216,642 | B1 * | 4/2001 | Hung | A01K 13/006 119/850 |
| D506,581 | S * | 6/2005 | Marlowe | 119/712 |
| 6,925,966 | B1 * | 8/2005 | Wexler | A01K 13/006 119/814 |
| 7,523,720 | B1 * | 4/2009 | Lecy | A01K 13/006 119/821 |
| 7,543,551 | B2 * | 6/2009 | Stampoultzis | A01K 13/006 119/850 |
| 8,833,311 | B2 * | 9/2014 | Kostelec | A01K 13/006 119/850 |
| 2006/0060155 | A1 * | 3/2006 | Ip | A61D 3/00 119/850 |
| 2007/0169444 | A1 * | 7/2007 | Hung | A01K 13/006 54/80.4 |

(Continued)

*Primary Examiner* — Yvonne Abbott-Lewis
(74) *Attorney, Agent, or Firm* — GrayRobinson, P.A.; Michael J. Colitz, III

(57) ABSTRACT

An animal guard comprising a sleeve with a guard section, intermediate section, and neck section, the guard section comprising a deformable mesh with a pair of snaps and the neck section comprising preferably cloth material terminating in a hem containing a drawstring to tighten the neck section around an animal's head, with the guard section overlapping the neck section in the intermediate section of the animal guard. The animal guard is designed to prevent bites from the animal while keeping the animal comfortable. The animal is able to be fed and watered while in the animal guard.

6 Claims, 4 Drawing Sheets

(56) References Cited

U.S. PATENT DOCUMENTS

| | | | |
|---|---|---|---|
| 2009/0090307 A1* | 4/2009 | Heister | A61D 9/00 |
| | | | 119/821 |
| 2011/0139091 A1* | 6/2011 | Ohashi | A01K 13/006 |
| | | | 119/821 |
| 2015/0053147 A1* | 2/2015 | Lippincott | A61D 9/00 |
| | | | 119/821 |
| 2016/0219834 A1* | 8/2016 | Cruz | A01K 13/006 |

* cited by examiner

NO-BITE ANIMAL GUARD

CROSS REFERENCE TO RELATED APPLICATIONS

This application claims priority to and is a continuation of provisional application Ser. No. 62/352,686 filed on Jun. 21, 2016 and entitled "No-Bite Animal Guard." The contents of this application is incorporated herein for all purposes.

TECHNICAL FIELD

This disclosure relates to an animal guard. More specifically, the present invention relates to an easy application animal guard for the prevention of animal bites.

BACKGROUND OF THE INVENTION

Muzzles are presently used to prevent an animal from biting. An animal may bite a person attempting to handle it for any number of reasons including fear, aggression, pain, or some other reason. For example, a dog may have had a painful experience during a traditional nail trim that continues to cause fear and aggression towards handlers. This fear typically leads to ongoing aggression that, if not addressed, may lead to risks for both the dog and the handler. For example, while handling a fearful dog that continuously tries to bite a handler, the handler could accidentally cut into the nerve portion of a dog's nail, also known as the quick. This will cause the dog pain and potentially cause the dog to lash out at the person attempting to cut the dog's nails. Animal bites can lead to infections, stitches, loss of limb, as well as a number of other potentially harmful results. Muzzles have been used to prevent the animal from biting the handler.

A muzzle is generally made of a hard plastic or metal and requires snapping or buckling the device around an animal's head. This action can be unwieldy and also subject the person attempting to apply the muzzle to an animal bite before getting the muzzle on the animal.

For example, U.S. Pat. No. 5,588,398 to Allen, I I et al. describes a remotely controllable dog muzzle apparatus that includes a cup-shaped snout shield to which is attached an accessory pod provided with stimulus generators such as a stun gun or sensors interactive with a physical environment of a dog fitted with the muzzle. The dog muzzle has a cup-shaped snout shield which is connected around the dog's neck by an adjustable buckle. The snout shield is not deformable nor does it allow for the animal to receive food or water. The shield also does not screen the animal's vision.

Another example is illustrated by U.S. Pat. No. 7,523,720 to Lecy et al. entitled "Pet Hood." The hood of Lecy allows an animal to see relatively unencumbered while at the same time preventing the animal from having oral contact with persons or other creatures. The hood is partly formed from a mesh that is most preferably a soft and lightweight plastic which is not harmful when swung by the animal. The hood is laced about the animal's neck region, and preferably includes a connection to a harness or other reliable anchor.

Although the background art achieves its own stated objectives, none of the background art relates to a flexible animal guard or to a guard that provides a deformable snout shield with an opening so the animal can receive food and water and for the guard to partially screen the animal's vision to prevent the animal from getting scared. The animal guard described herein is aimed at overcoming these and other shortcomings noted in the background art.

SUMMARY OF THE INVENTION

In accordance with the present invention, an animal guard comprising a sleeve with a guard section, intermediate section, and neck section, the guard section comprising a deformable mesh with a pair of snaps and the neck section comprising preferably cloth material terminating in a hem containing a drawstring to tighten the neck section around an animal's head, with the guard section overlapping the neck section in the intermediate section of the animal guard.

The disclosed system has several important advantages. For example, the deformable mesh end of the animal guard prevents bites when in place.

A further possible advantage is that the cloth end of the animal guard screens the animal's vision so as to prevent the animal from getting distracted or panicked from what the animal sees in its peripheral vision.

A further advantage is the disclosed animal guard provides a deformable snout shield with an opening for food and water.

A further advantage is that the deformable mesh end of the animal guard can be partially closed to prevent aggressive animals from lunging and biting a handler.

A further advantage is that the animal guard uses a pull string to affix the animal guard over the animal's head, thereby preventing awkward attempts to buckle or snap a muzzle as the animal is attempting to bite the handler.

A further advantage is that the pull string allows for easy removal of the animal guard once the procedure that necessitated use of the animal guard is complete.

A further advantage is that the animal guard can come in a variety of sizes.

A further advantage is that the animal guard is generally made of soft material so that the occurrence of injury to the animal is lowered and to provide for easier storage/transport.

Yet another advantage is realize by providing a pet hood that flexes between neck and guard regions to ensure a proper fit upon the animal.

A further advantage is realized by providing a pet hood with a guard section that, when in position upon an animal, is generally in axial alignment with the animal's snout.

Various embodiments of the invention may have none, some, or all of these advantages. Other technical advantages of the present invention will be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

DETAILED DESCRIPTION OF THE DRAWINGS

This disclosure relates to an animal hood that can be securely fastened over the head of an animal. The hood is formed from a mesh material that does not limit the animal's vision. It includes a forward portion that can be closed via a fastener if there is a danger of the animal biting its handler. The various components of the present disclosure, and the manner in which they interrelate, are described in greater detail hereinafter.

Figure 1:
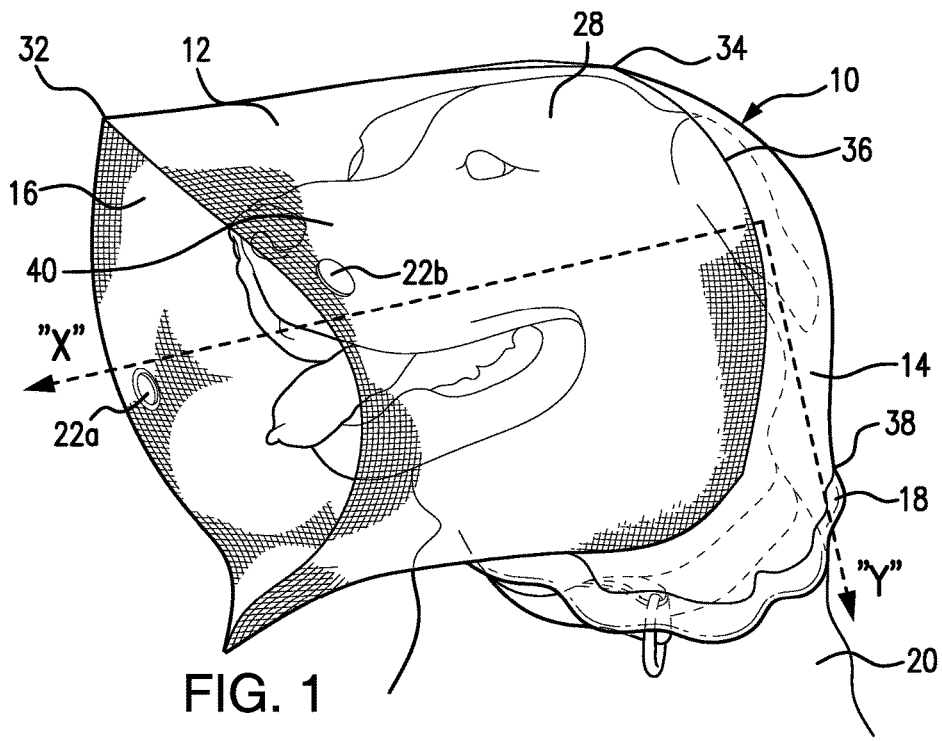
FIG. 1 is a perspective view of the animal guard in an open configuration with an animal placed inside.

The present disclosure relates to an animal guard 10. As shown in FIG. 1, the animal guard 10 comprises a guard section 12 and a neck section 14 for an animal 20. The neck section 14 terminates in a hem 18 at a proximal end 38 with an opening 30 for a drawstring 24 having a tightener 42 throughout the length of the hem 18. The width of the hem 18 should be wider than that of the drawstring 24 to provide for easy motion when tightening the drawstring 24. Preferably, the neck section 14 is made of cloth but may be made of any material that can be hemmed and used with a drawstring 24. Guard 10 is sufficiently flexible to bend between the neck 14 and guard 12 sections.

Preferably, neck section 14 is flexible such that a proximal end of the neck section can be folded over onto the distal end. This folded over configuration allows the guard 10 to be easily slipped over the head and neck of the animal. Once in position, the neck section 14 can then be unfolded. The guard section 12 is preferable made of a deformable plastic mesh. The use of a plastic mesh creates a safe barrier from any attempted bites from the animal 20 while still allowing the animal 20 to see what is going on around it, calming the animal. This is accomplished by making the openings in the mesh sufficiently large enough so that the guard is semi-transparent to the animal. This allows the animal to see while in the animal guard 10 prevents it from feeling unsafe and becoming scared or more aggressive. The use of mesh also allows for the animal 20 to remain cool and comfortable.

Figure 2:
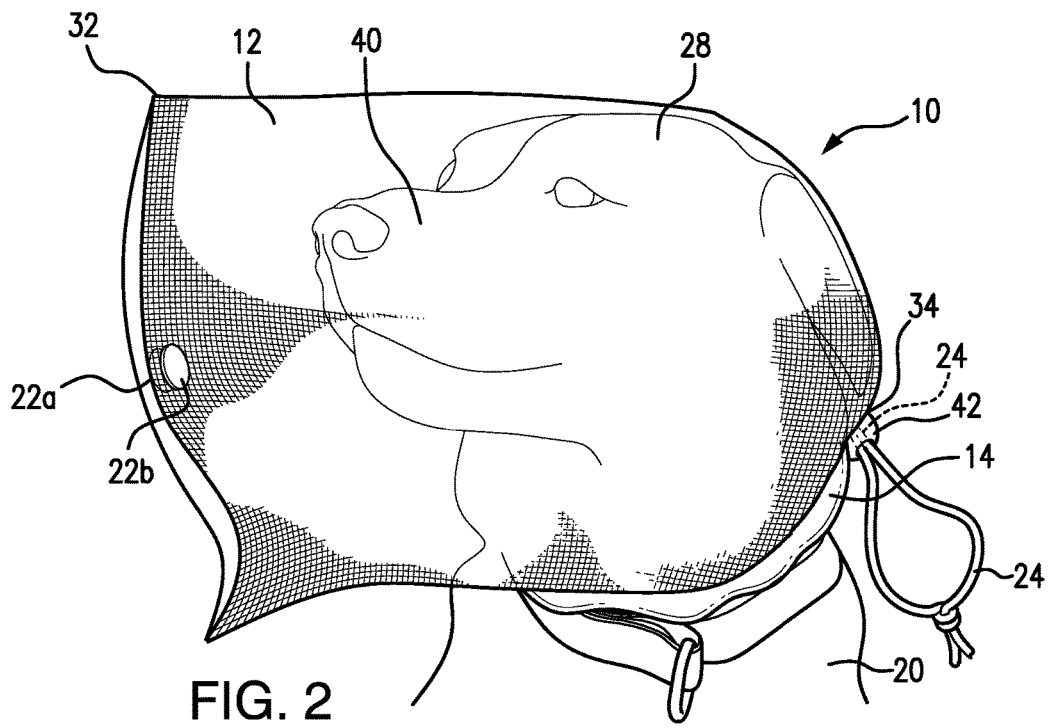
FIG. 2 is a perspective view of the animal guard in the closed configuration with an animal placed inside.

As can be seen in FIG. 2, in the event the animal 20 is too aggressive or has a snout 40 that reaches too far forward in the animal guard 10, a pair of snaps 22a, 22b are located on the distal end 32 of the guard section 12. Specifically, a first male fastening element is positioned on one opposing side of the guard and a second female fastening element is positioned on the opposite side of the guard. These fasteners or snaps can close the opening 16 on the distal end 32 closest to the snout 40 to further prevent bites. The opening 16 also allows the animal 20 to be fed or watered when inside the animal guard 10. When the snaps 22 are closed together, the animal 20 cannot bite the handler but can still be provided water or other refreshment. In the preferred size, guard section 12 is long enough so that some space exists between the end of the dog's snout and the snaps 22a/22b. Guard 10 can come in a variety of sizes to ensure a proper fit upon the animal.

Figure 3:
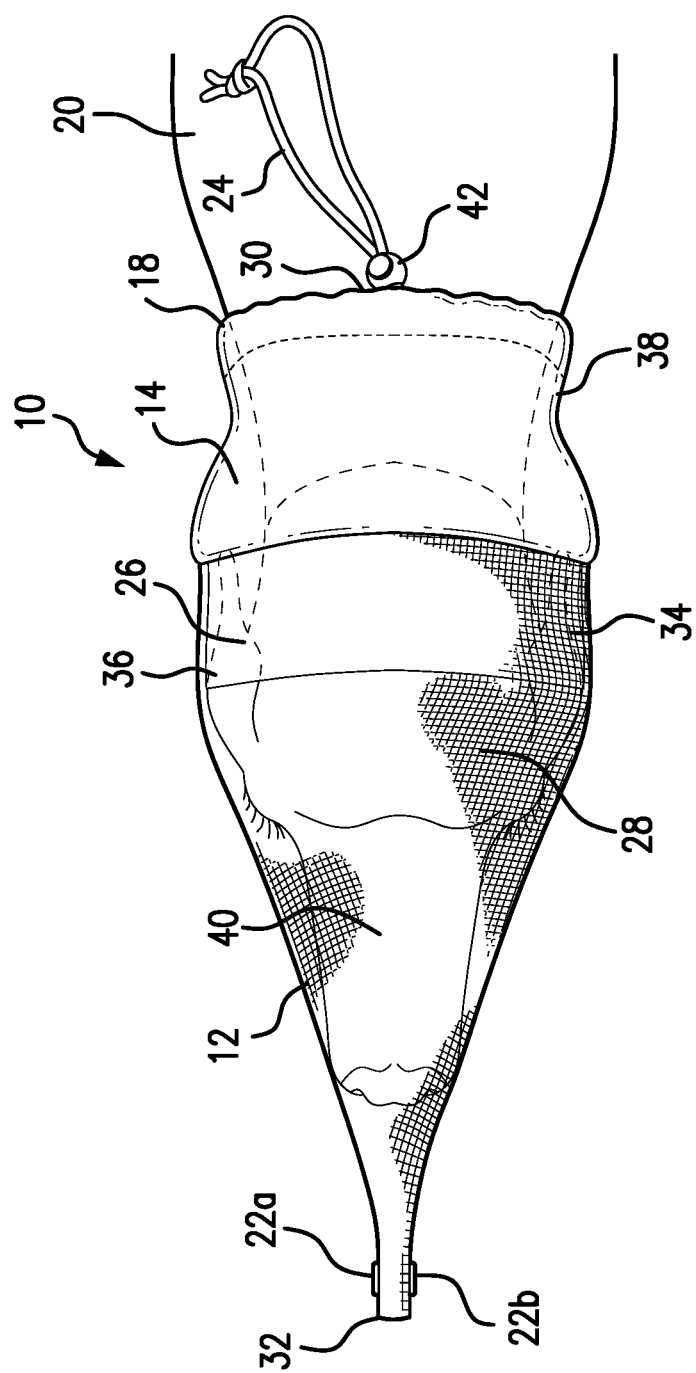
FIG. 3 is a top view of the animal guard with an animal placed inside.
Figure 4:
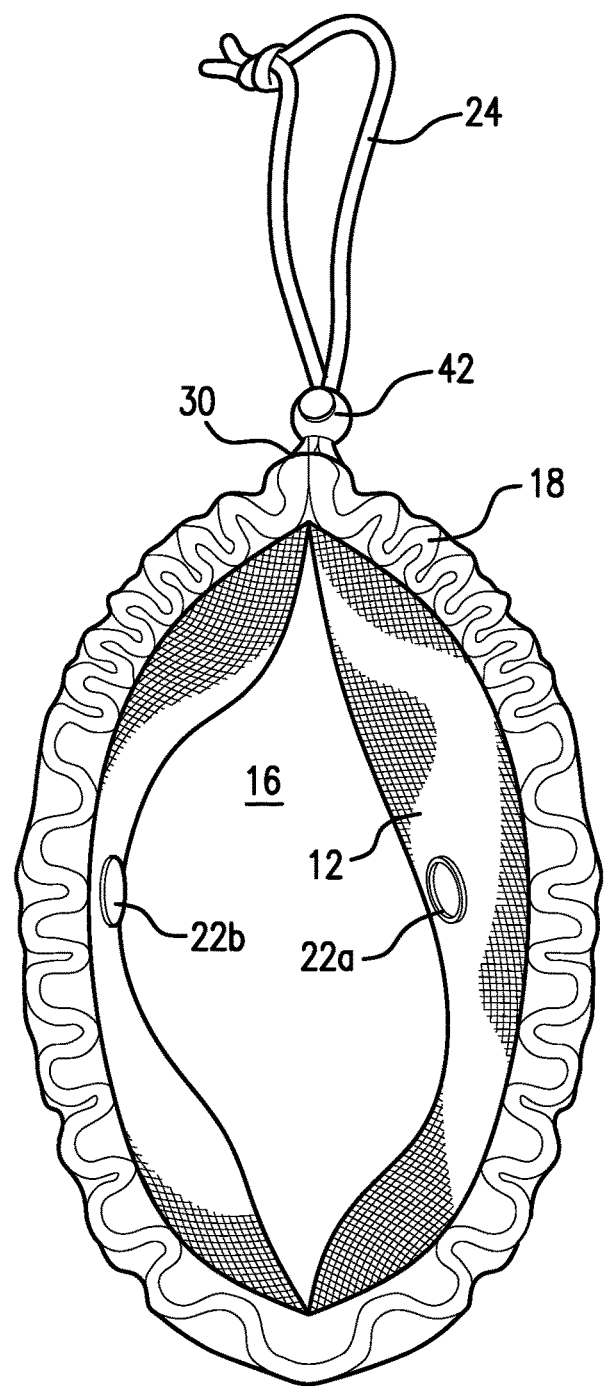
FIG. 4 is a view of the proximal end of the animal guard in an open configuration.
Figure 5:
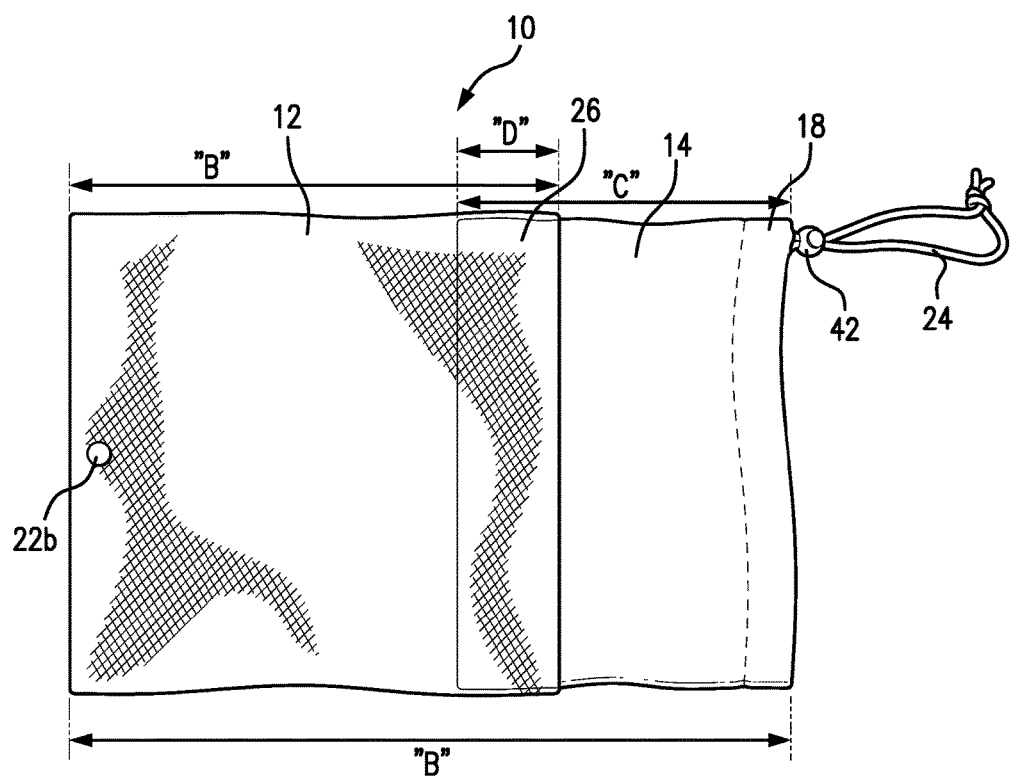
FIG. 5 is a side view of the animal guard.

As can be seen in FIGS. 3-5, the animal 20 fits into the animal guard 10 by fitting the animal guard 10 over the head 28 of the animal 20. The animal guard 10 is essentially a sleeve with an opening 16 that runs from the neck section 14 through the guard section 12. The animal guard 10 has an intermediate section 26 where the proximal end 36 of the guard section 12 and the distal end 34 of the neck section 14 overlap. The intermediate section 26 comprises the area where the guard section 12 and the neck section 14 are stitched together and overlap. The width of the intermediate section 26 can vary based on the size of the animal 20 placed in the animal guard 10 but is preferably wide enough such that the guard section 12 and the neck section 14 do not come apart if the animal 20 shakes or moves its head 28.

In one aspect of the invention, the length "B" of guard section 12 forms approximately over 50% of the overall length "A" of guard 10. Additionally, length "C" of neck section 14 forms approximately 33% of the overall length. Intermediate section 26 has a length "D" that forms about 10% of the overall length. This geometry is important because guard 10 will most often be used on snouted animals such as dogs. As such, guard section 12 must be the largest of the three sections. It is also important that the materials employed be flexible enough such that guard 10 can bend between neck section 14 and guard section 12. When in position on a dog, for example, an obtuse angle will be formed between the neck section 14 and guard section 12. Namely, the angle between axes "X" and "Y" will be between 90 degrees and 180 degrees (note FIG. 1). This allows the snout of the animal to be generally in alignment with the major, or longitudinal, axis of the guard section 12. This arrangement allows the animal to see out the opened end of guard section 12 when it is opened. And when guard section 12 is closed via fasteners 22a and 22b, the animal will still have the ability to see through the mesh openings.

When in use, the neck section 14 can be folded over the intermediate portion 26 and slipped over the animal's head 28. The neck section 14 is then unfolded and quickly closed by pulling on the drawstring 24 using the tightener 42. The drawstring 24 prevents the animal guard 10 from slipping off of the animal 20 and also reduces the chance of the animal 20 biting the handler because the handler does not have to reach around the animal's head 28 to secure the animal guard 10.

It will be understood that the aforementioned embodiments of the present invention are not limited to the described combination. Instead, the features of one of the preferred embodiments of the present invention may be readily combined with those of another or other embodiments of the present invention without departing from the scope of the present invention.

It will be readily understood that the described embodiments of the invention are exemplary only and various other features and details could be incorporated in the system described herein without departing from the spirit and scope of the invention as defined in the appended claims.

What is claimed is:

1. A hood adapted to be fitted over the head and neck of an animal, the hood having an overall length and functioning to prevent the animal from biting or injuring a handler, the hood comprising:
   a neck section having proximal and distal ends and an intermediate extent therebetween, the neck section formed from a soft cloth material having a generally tubular shape with openings at the proximal and distal ends, a hem formed about a periphery of the proximal end, a drawstring positioned within the hem, a releasable closure slidably positioned along the drawstring for selectively narrowing and enlarging the size of the proximal opening, the cloth material being sufficiently flexible to enable the proximal end of the neck section to be folded over the distal end of the neck section, the neck section constituting approximately 33% of the overall length of the hood;
   a guard section having proximal and distal ends and an intermediate extent therebetween, the guard section being formed from a deformable plastic mesh with a series of openings, the openings in the guard section being large enough to permit the guard section to be semi-transparent to the animal, the guard section having a generally tubular opening at the proximal end and a generally distal end at the distal end, the oval opening having a first and second opposing sides, a male fastener positioned on the first opposing side and a female fastener positioned on the second opposing side, the male and female fasteners being releasably coupled to selectively close and open the distal end of the guard section, the guard section constituting over 50% of the overall length of the hood;

an intermediate section formed from overlapping portions of the distal end of the neck section and the proximal end of the guard section, the intermediate section being flexible and permitting the hood to bend between the neck and guard sections, the intermediate section constituting approximately 10% of the overall length of the hood;

wherein the proximal end of the neck section can be folded over the distal end of the neck section to position the hood over the neck of the animal and thereafter the neck section can be unfolded so that the drawstring can be tightened to secure the hood in place, and wherein the opposing sides of the guard section can be selectively closed to prevent the animal from biting the handler.

2. A hood to be fitted over the head of an animal, the hood comprising:
   a neck section made of soft cloth material and having first and second opened ends, a drawstring for use in securing the first end over the neck of the animal;
   a guard section formed from a mesh material and having first and second opened ends, a fastener for releasably closing the second end of the guard section;
   an intermediate section formed from the second end of the neck portion being secured in an overlapping manner with the first end of the guard section.

3. The hood as described in claim 2 further comprising a hem formed within a periphery of the first end of the neck section and wherein the drawstring is positioned within the hem.

4. The hood as described in claim 2 wherein when the hood is positioned upon the animal the guard section forms an obtuse angle relative to the neck section, and wherein the guard section includes a longitudinal axis.

5. The hood as described in claim 4 wherein the animal has a snout and when the hood is in place upon the animal the snout is generally in line with the longitudinal axis of the guard section.

6. The hood as described in claim 2 wherein the hood has an overall length and the guard section constitutes approximately over 50% of the overall length and the neck section constitutes approximately 33% of the overall length.

\* \* \* \* \*